(12) United States Patent
Jendrichowski

(10) Patent No.: US 8,371,433 B2
(45) Date of Patent: Feb. 12, 2013

(54) CONVEYOR FOR TRANSPORTING BOTTLES OR CONTAINERS HAVING VARYING DIAMETERS IN LINES TO A BOTTLE OR CONTAINER CLEANING MACHINE OR PACKAGING MACHINE, AND A METHOD AND APPARATUS FOR CONVEYING BOTTLES OR CONTAINERS

(75) Inventor: Klaus Jendrichowski, Holzwickede (DE)

(73) Assignee: KHS GmbH, Dortmund (DE)

( * ) Notice: Subject to any disclaimer, the term of this patent is extended or adjusted under 35 U.S.C. 154(b) by 224 days.

(21) Appl. No.: 12/413,512

(22) Filed: Mar. 27, 2009

(65) Prior Publication Data

US 2009/0260952 A1  Oct. 22, 2009

Related U.S. Application Data

(63) Continuation-in-part of application No. PCT/EP2007/007817, filed on Sep. 7, 2007.

(30) Foreign Application Priority Data

Sep. 30, 2006  (DE) .................. 10 2006 046 556

(51) Int. Cl.
  *B65G 21/20*  (2006.01)
  *B65G 47/68*  (2006.01)
(52) U.S. Cl. ................. 198/445; 198/442; 198/457.07; 198/836.4
(58) Field of Classification Search .................. 198/429, 198/442, 445, 457.05, 457.07, 458, 836.4
See application file for complete search history.

(56) References Cited

U.S. PATENT DOCUMENTS

| | | | |
|---|---|---|---|
| 2,451,104 A * | 10/1948 | Lowe | 198/442 |
| 2,951,574 A | 9/1960 | Craig | |
| 3,767,027 A * | 10/1973 | Pund et al. | 198/452 |
| 3,860,232 A * | 1/1975 | Martin | 271/198 |
| 4,003,465 A * | 1/1977 | Bauer | 198/442 |
| 4,173,276 A * | 11/1979 | Raudat et al. | 198/437 |
| 4,880,104 A | 11/1989 | Evans et al. | |
| 4,966,272 A * | 10/1990 | Raudat | 198/446 |
| 5,246,314 A | 9/1993 | Smith et al. | |
| 5,768,860 A * | 6/1998 | Weaver | 53/543 |
| 5,788,052 A * | 8/1998 | Spatafora | 198/442 |
| 5,937,995 A * | 8/1999 | Hartness et al. | 198/445 |
| 6,334,527 B1 * | 1/2002 | Kitamura | 198/704 |
| 6,463,713 B1 * | 10/2002 | Ruemeli | 53/52 |
| 7,207,428 B2 * | 4/2007 | Huttner | 198/444 |
| 7,617,926 B2 * | 11/2009 | Jacob et al. | 198/836.3 |

FOREIGN PATENT DOCUMENTS

| | | |
|---|---|---|
| DE | 36 13 724 | 10/1987 |
| DE | 92 04 040 | 5/1992 |
| DE | 41 14 875 | 11/1992 |
| DE | 197 51 967 | 6/1999 |
| DE | 299 01 401 | 6/1999 |
| DE | 20 2005 014 167 | 11/2005 |

(Continued)

OTHER PUBLICATIONS

International Search Report PCT/EP2007/007817 and English translation thereof.
Chinese Office Action 2007800365846.

*Primary Examiner* — Douglas Hess
(74) *Attorney, Agent, or Firm* — Nils H. Ljungman & Associates

(57) ABSTRACT

Conveyor for transporting bottles or containers having varying diameters in lines to a bottle or container cleaning machine or packaging machine, and a method and apparatus for conveying bottles or containers.

15 Claims, 8 Drawing Sheets

FOREIGN PATENT DOCUMENTS

| | | |
|---|---|---|
| DE | 600 22 910 | 7/2006 |
| EP | 1 282 572 | 2/2003 |
| JP | 6001414 A | 1/1994 |
| JP | 6345247 A | 12/1994 |
| JP | 9230575 A | 9/1997 |
| WO | WO 00/59813 | 10/2000 |

* cited by examiner

CONVEYOR FOR TRANSPORTING BOTTLES OR CONTAINERS HAVING VARYING DIAMETERS IN LINES TO A BOTTLE OR CONTAINER CLEANING MACHINE OR PACKAGING MACHINE, AND A METHOD AND APPARATUS FOR CONVEYING BOTTLES OR CONTAINERS

CONTINUING APPLICATION DATA

This application is a Continuation-In-Part application of International Patent Application No. PCT/EP2007/007817, filed on Sep. 7, 2007, which claims priority from Federal Republic of Germany Patent Application No. 10 2006 046 556.3, filed on Sep. 30, 2006. International Patent Application No. PCT/EP2007/007817 was pending as of the filing date of this application. The United States was an elected state in International Patent Application No. PCT/EP2007/007817.

BACKGROUND

1. Technical Field

This application relates to a conveyor for transporting bottles or containers having varying diameters in lines to a bottle or container cleaning machine or packaging machine, and a method and apparatus for conveying bottles or containers. This application further relates to a conveyor line for the transport of bottles or similar containers in a direction of transport, whereby the conveyor line for the containers forms, at least over a partial length that extends in the direction of transport, at least two lanes, which are bounded laterally and separated from one another by lane guides which are at some distance from another in the direction at a right angle to the direction of transport.

2. Background Information

Background information is for informational purposes only and does not necessarily admit that subsequently mentioned information and publications are prior art.

Conveyor lines for the transport of bottles or similar containers may be configured such that the conveyor line in question forms a plurality of lanes that are bounded laterally and separated from one another by lane guides in which the containers are moved individually in the form of a single-file flow of containers in the direction of transport. Conveyor lines of this type can form, for example, the inlet of container handling machines, such as container cleaning machines, or possibly container packaging machines.

If different types of bottles or similar containers that have different diameters are to be transported on a conveyor line of this type, the width of the lanes may be adapted to the diameter of the containers to promote the organized, single-lane flow of containers in each lane and to minimize or essentially prevent the containers from tipping over.

The containers are thereby oriented in an upright position on the transport plane or surface of the conveyor line, which can be formed by a plurality of conveyor belts, for example.

OBJECT OR OBJECTS

The object of at least one possible embodiment is to create a conveyor line in which the width of the lanes can be adapted to the diameter of the containers essentially without an adjustment of the actual lane guides which, for example, extend into the container treatment machine.

SUMMARY

The application teaches that this object can be accomplished by a conveyor line for the transport of bottles or similar containers in a direction of transport, whereby the conveyor line for the containers forms, at least over a partial length that extends in the direction of transport, at least two lanes, which are bounded laterally and separated from one another by lane guides which are at some distance from another in the direction at a right angle to the direction of transport. In addition to the lane guides, container control and guide elements, which are oriented with their longitudinal extension in the direction of transport, are provided, which form lateral guide surfaces for the containers in the respective lane, and which make possible, at least over a partial length of the lanes, by reducing a maximum lane width defined by the distance between the lane guides, an adaptation of the lane width to the diameter of the individual containers to be processed.

In at least one embodiment of the conveyor line disclosed herein, the lane width is adapted to the diameter of the containers currently being processed over at least a partial length of the conveyor line or the lanes formed by it by container control and guide elements, in that the maximum lane width which is specified by the invariable distance between two neighboring lane guides is reduced to a width that is adapted to the diameter of the containers being treated.

In a first basic embodiment of the application, the container control and guide elements are provided on at least one side of each lane or on a lane guide located there, and specifically so that to adjust the lane width, the guide elements which extend in the direction of transport can be adjusted at a right angle to the direction of transport and thereby at least also in the direction parallel or approximately parallel to the transport plane. In an additional possible embodiment of the application, the container control and guide elements are moldings or panels which can be fastened to the existing, non-adjustable lane guides, for example by positioning them from overhead, and which form the control and guide surfaces that reduce the lane width.

Developments of at least one possible embodiment are described in the features of the possible embodiments of the application disclosed herein below. At least one possible embodiment is explained in greater detail below on the basis of one exemplary embodiment which is illustrated in the accompanying figures.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

In the figures, 1 is a conveyor line for bottles or similar containers 2 which are moved in a direction of transport A standing upright on a horizontal or essentially horizontal transport plane or surface 3 which is formed by a plurality of conveyor belts, i.e. with their bottle or container axis oriented in a vertical direction.

Figure 1:
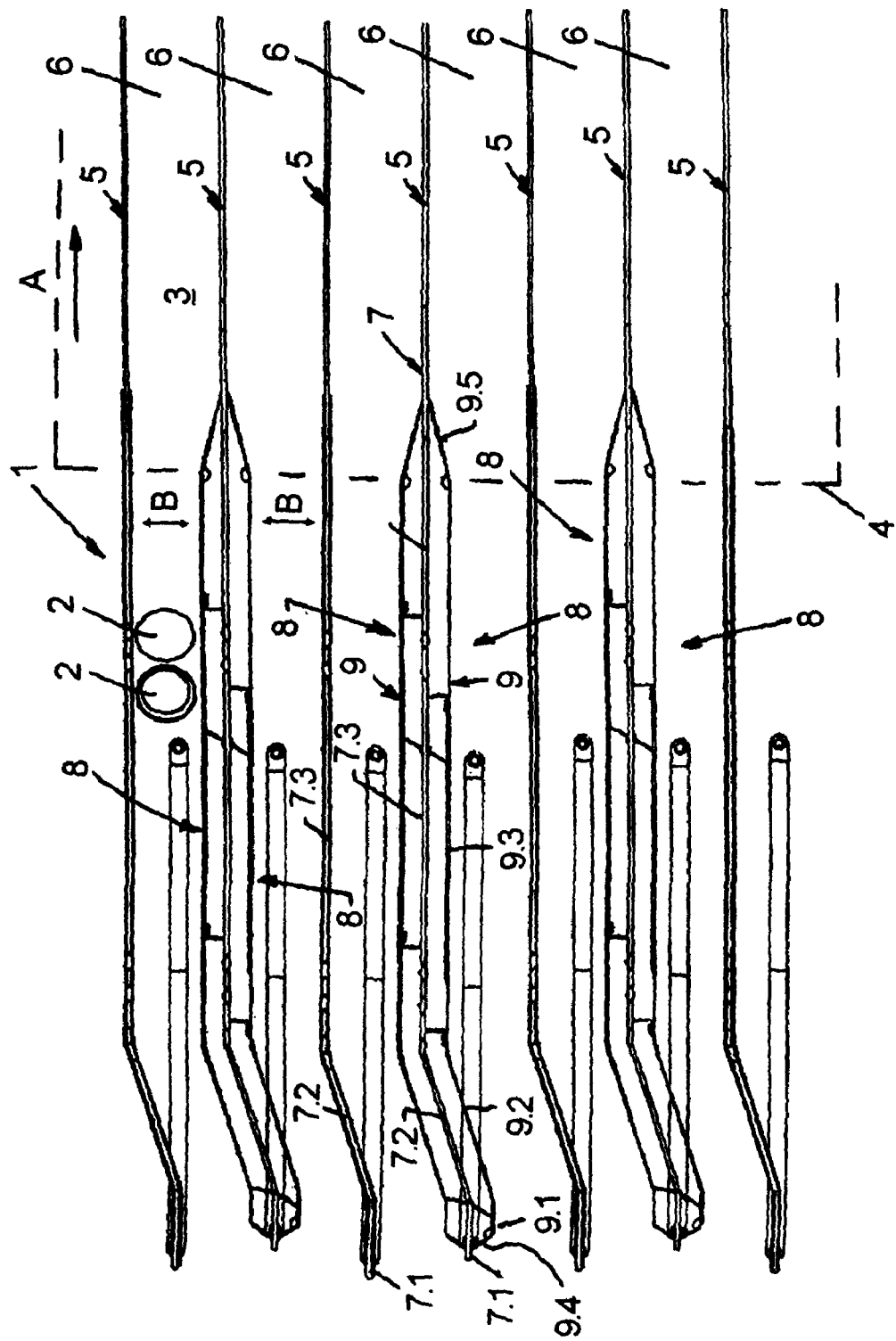
FIG. 1 is a simplified plan view of a conveyor for the transport of a multi-lane container flow in lanes with adjustable lane width.

The conveyor line 1 can form, for example, the inlet of a container handling machine which is illustrated substantially schematically in FIG. 1 and is identified as 4, e.g. a cleaning machine, to which the containers 2 are fed in a multiple-lane container flow and in a plurality of lanes 6 which are separated from one another by a plurality of lane guides, i.e. in the illustration in FIG. 1 in a total of six lanes 6, in the direction of transport A.

The lane guides 5 which separate the individual lanes 6 from each other and also form the boundaries of the outermost lanes 6 are each formed by guide walls 7 which form lateral guide surfaces for the containers 2 which project upward beyond the plane of the transport surface 3. Corresponding to the general layout of the lanes 6, the guide walls 7 are each composed of a wall segment 7.1 which is oriented in the direction of transport A, a wall segment 7.2 which runs at an angle to the direction of transport A and a wall segment 7.3 which again runs in the direction of transport A, whereby these wall segments follow one another in the direction of transport A in the sequence indicated above, and are each oriented with their planes perpendicular or transverse to the plane of the transport surface 3.

If the conveyor line 1 is to be used to transport bottles or containers 2 with a different diameter, the width of the lanes 6 may be adjusted or adapted at least at the inlet to the treatment machine 4 to the diameter of the containers 2 so that the effective lane width is equal to or slightly greater than the container diameter, to prevent or minimize, among other things, a tipping of the containers 2 during transport. This adaptation of the lane width is achieved by reducing the maximum lane width which is defined by the distance between neighboring lane guides 5. For the lane width adaptation, the lane guides 5 are partly provided with container control and guide elements 8 which form lateral guide surfaces for the containers 2 in the lanes 6 and are adjustable in the direction at a right angle to the direction of transport A.

In the exemplary embodiment illustrated in FIG. 1, container control and guide elements 8 of this type are provided only on those lane guides which separate two neighboring lanes 6 from one another, and specifically in a direction at a right angle to the direction of transport A, as well as only on every second lane guide 5 which separates two lanes 6 from each other. The container control and guide elements 8 are also provided in pairs on the respective lane guide 5, i.e. one container control and guide element 8 of each such pair is located on each side of the lane guide 6 in question at a right angle to the direction of transport A and facing each other.

In an additional exemplary embodiment not shown, the container control and guide elements 8 may be provided in a design and quantity so that they are located on both guide walls 7 of each lane 6. This solution makes it possible to also guide containers 2 with diameters smaller than the lane width centrally in the lane 6 which, for example, simplifies the transfer of these containers 2 to the transfer finder of a container treatment machine 4.

The container control and guide elements 8, like the lane guides 5, are formed by guide walls 9 which project upward above the plane of the transport surface 3 and are composed of a plurality of wall segments, and specifically of a wall segment 9.1 which runs in the direction of transport A, a wall segment 9.2 which runs at an angle to the direction of transport A and a wall segment 9.3 which runs in the direction of transport A, whereby the wall segments follow one another in the sequence indicated above in the direction of transport A. The wall segments 9.1 are parallel or essentially parallel to the associated wall segment 7.1, the wall segments 9.2 are parallel or essentially parallel to the associated wall segment 7.2 and the wall segments 9.3 are parallel or essentially parallel to the associated wall segment 7.3. In at least one possible embodiment, each of the wall segments 9.1 and 9.3 may be disposed, for example, at an angle of 16, 17, 18, 19, or 20 degrees with respect to the wall segment 9.2. It should be understood that the wall segments 9.1 and 9.3 may be positioned with respect to the wall segment 9.2 at angles greater than 20 degrees or less than 16 degrees.

Figure 4:
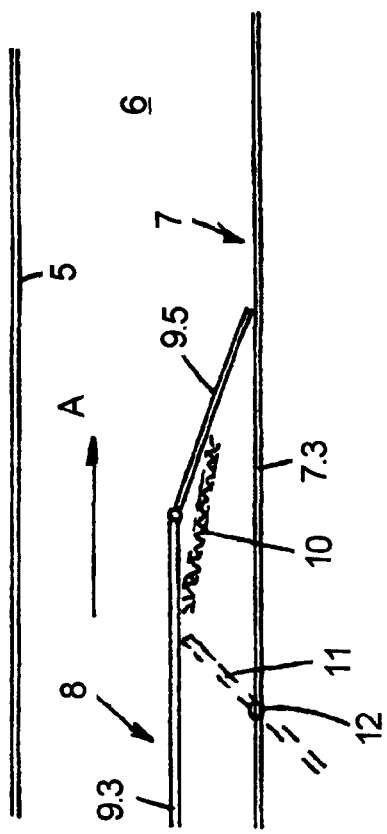
FIG. 4 is a schematic view of one end of a container control and guide element.

On the front and rear ends with reference to the direction of transport A, each container control and guide element 8 has an additional wall segment 9.4 or 9.5, which is articulated around an axis which is perpendicular or transverse to the plane of the transport surface 3 on the wall segment 9.1 or 9.3, and is prestressed by spring means 10, for example, so that the wall segment 9.4 or 9.5 in question is in contact by means of its edge which is farther from the wall segment 9.1 or 9.3 against the associated lane guide 5 or against the wall segment 7.1 or 7.3 outside the respective container control and guide element 8, as is also illustrated in FIG. 4. The wall segments 9.4 and 9.5 hereby ensure or promote a smooth transition between the guide walls 7 and 9 which is independent of the adaptation of the lane width.

Figure 4A:
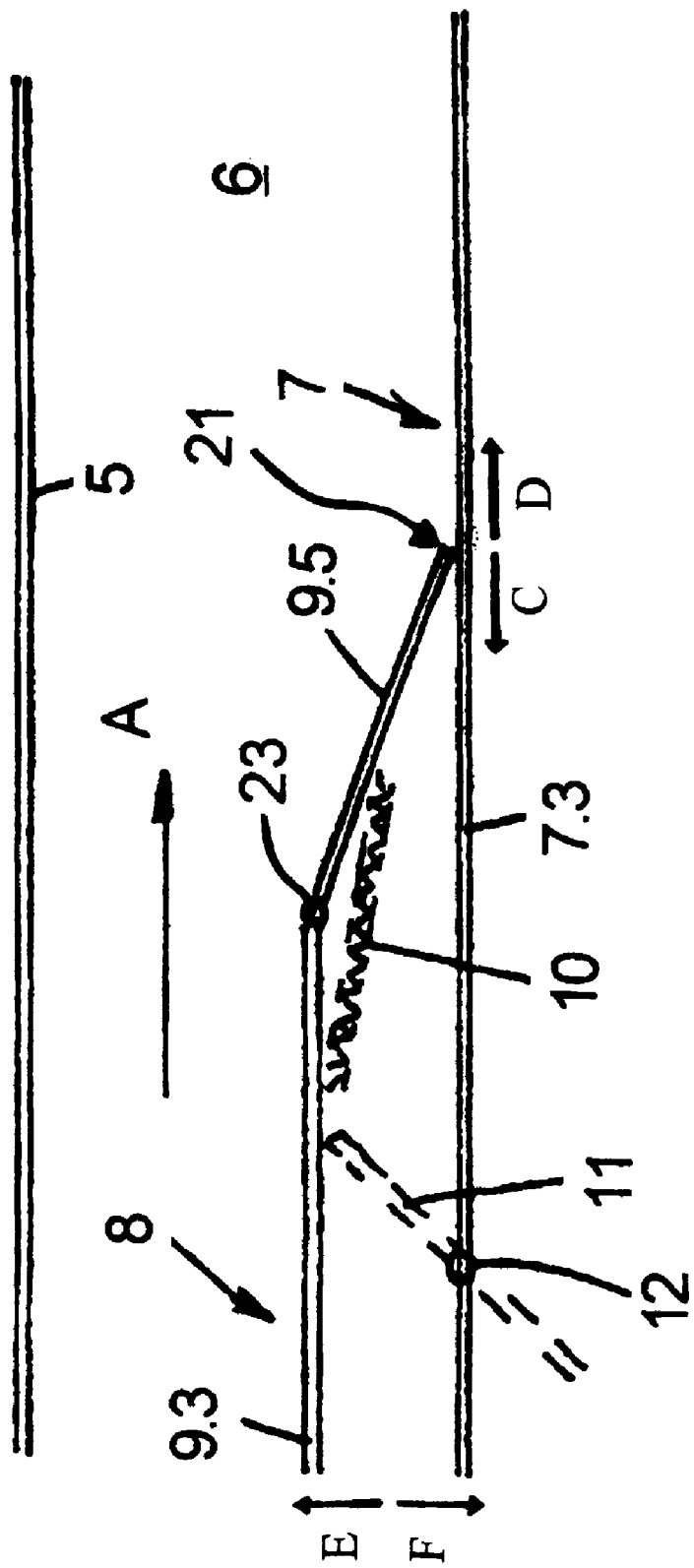
FIG. 4A shows the schematic view of FIG. 4 with additional details.

To further explain and as shown in FIG. 4A, as the wall segment 9.3 is moved in the direction E away from the wall segment 7.3, the spring means 10 pulls the wall segment 9.5 substantially in the direction C and the end 21 slides along the guide wall 7 in the direction C. In this manner, as the wall segment 9.3 is moved away from the wall segment 7.3, the end 21 remains in contact with the guide wall 7 to maintain a smooth transition between the guide walls 7 and 9. When the wall segment 9.3 is moved back toward the wall segment 7.3 in the direction F, the contracting or pulling force of the spring means 10 is overcome by the closing force produced by the spring arrangement 25 (shown in FIG. 1A) and the end slides back in the direction D along the guide wall 7. The spring means 10 is stretched during this movement as the guide wall 9 is essentially or substantially flattened. The pivoting movement of the wall segment 9.5 with respect to the wall segment 9.3 is permitted by the articulated connection 23.

The guide walls 9 of the container control and guide elements 8 are provided on a machine frame (not shown) of the conveyor line 1 so that they can be adjusted by adjustment elements 11 to adapt the lane width perpendicular or transverse to the direction of transport A, and specifically between a position in which the guide walls 9 are in tight contact against the guide wall 7 of the associated lane guide 5 and a position in which the guide walls 9 of the container control and guide elements 8 are at some distance from the guide wall 7 of the associated lane guide 5, as illustrated by the double arrows B in FIG. 1. Because both the lane guides 5 as well as the container control and guide elements 8 are formed respectively by the guide walls 7 and 9 respectively, and the means not shown which make possible the lateral adjustment of the container control and guide elements 8 are located below the plane of the transport surface 3, the guide walls 9 with the lane width set to maximum are in the tightest possible contact against the guide wall 7 of the corresponding lane guide 5. In spite of the lane width adaptation, especially when the lane width is set to maximum, dead spaces are avoided or minimized, especially when the lane width is set to the maximum, which makes it possible to keep the lanes 6 immediately next to one another and thus to have a small distance between the lanes 6. As shown in FIG. 4, the guide walls 9 have a height which is somewhat lower than the height of the guide walls 7, although the guide walls 9 are high enough to guarantee or promote a reliable guidance of the containers 2.

The guide walls of the container control and guide elements 8 can be prestressed, for example, by spring means in their initial position in which they are in contact with the associated guide wall 7 or are immediately next to the guide wall 7, and can be adjusted by the adjustment elements 11 against these spring means to set or adjust the lane width. The adjustment means 11 can, for example, be realized in the form of blades or wings and can be provided on a shaft 12 which is oriented with its axis perpendicular or transverse to the plane of the transport surface 3, and lies in the center plane of the guide wall 7 in question. Each blade-like adjustment element 11 which is located above the plane of the transport surface 3 forms, with its ends that are at some distance from the shaft 12 and project radially from it, contact surfaces with which the adjustment element 10 is in contact against the interior surface of each guide wall 9 facing away from the lane 6 in question, and specifically so that when the shaft 12 is rotated via the adjustment element 11, the two guide walls 9 of the container control and guide elements 8 which are provided on both sides of the lane guide 5 in question are moved away from each other to reduce the lane width or to adjust the lane width. The guide means for the guide walls 9 are thereby realized so that the guide walls 9 that are provided on both sides of a guide wall 7 are always or usually moved in the same direction away from this guide wall 7. For the container control and guide elements 8 which are arranged in pairs, a plurality of adjustment elements 11 are provided and all of the adjustment elements 11 of the conveyor line 1 and their shafts 12 are in a driving connection with one another so that by means of a common drive, all of the lanes 6 can be adjusted jointly either manually or by motor.

Figure 1A:
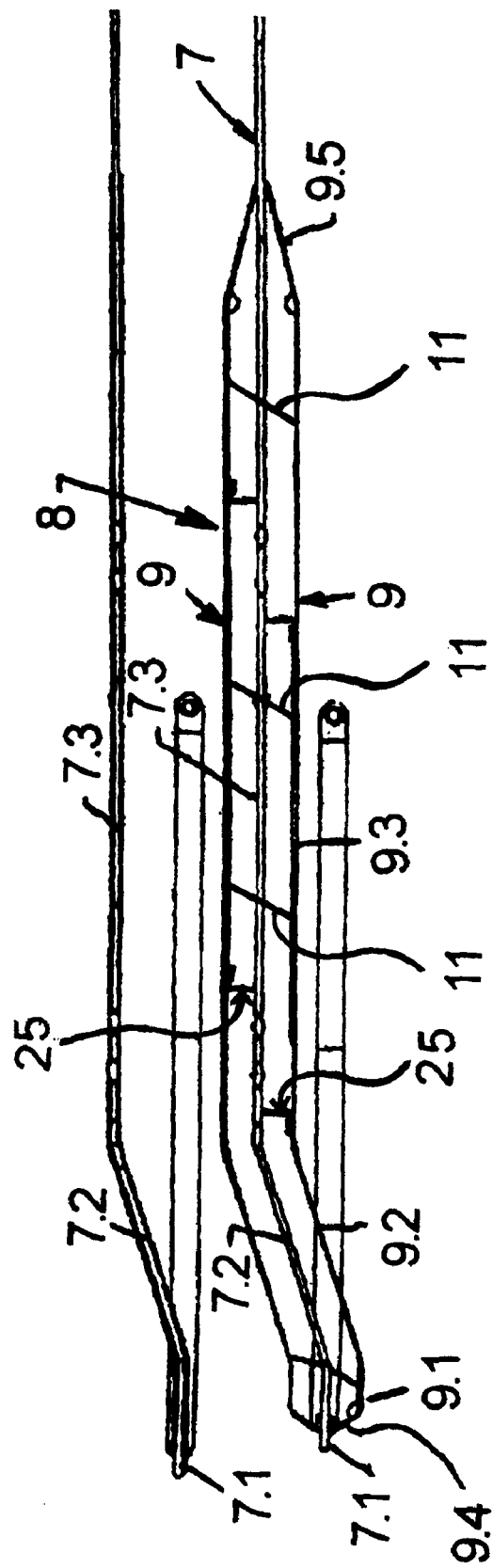
FIG. 1A shows an enlarged view of a portion of a conveyor shown in FIG. 1.
Figure 2:
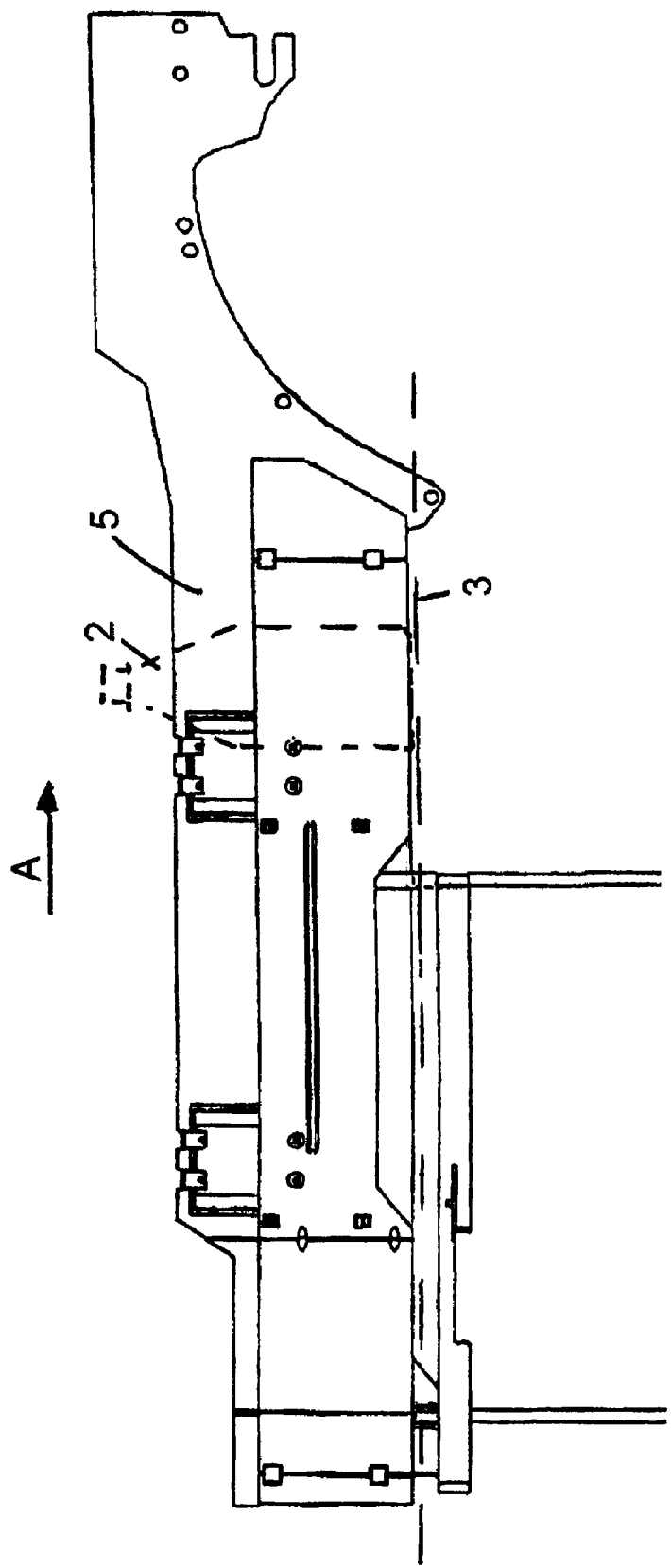
FIG. 2 is a side view of the lane guides of the conveyor illustrated in FIG. 1, together with an adjustable container control and guide element.
Figure 3:
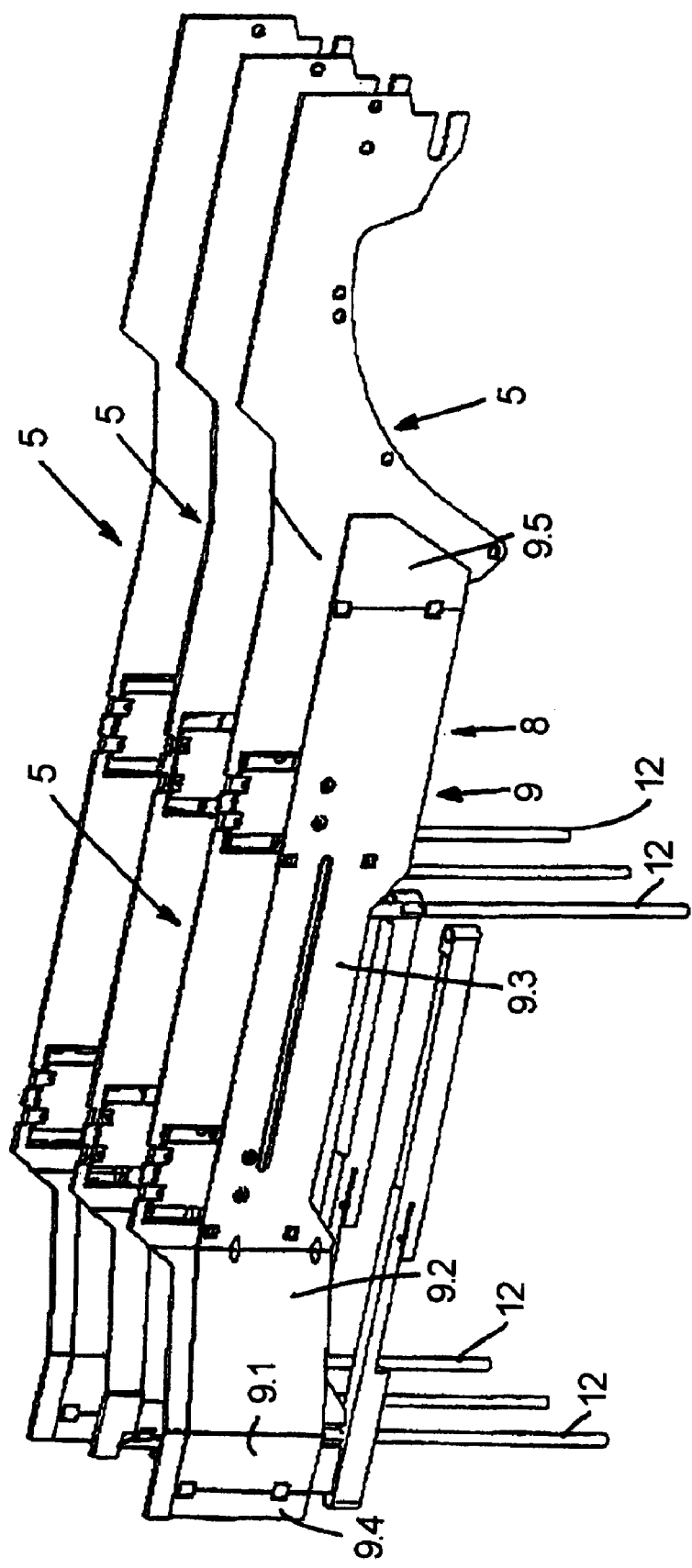
FIG. 3 is a view in perspective of several lane guides of the conveyor line illustrated in FIG. 1.

FIG. 1A shows at least one possible embodiment in which a spring arrangement 25 biases the movable guide wall 9 toward or against the guide wall 7. The biasing force produced by the spring arrangement 25 can be overcome by the opening force produced by the turning of the adjustment element 11 to thus allow for movement of the guide wall 9 away from the guide wall 7. In the embodiment shown in FIG. 1A, there are a plurality of adjustment elements 11 which can work in conjunction with one another to push the movable guide wall 9. When the adjustment elements 11 are turned back to their starting position substantially parallel to the guide wall 7, the spring arrangement 25 pulls or moves the guide wall 9 toward the guide wall 7 as the adjustment elements 11 move. The closing force produced by the spring arrangement 25 is greater than the contracting force produced by the spring means 10 shown in FIGS. 4 and 4A. In at least one possible embodiment, the spring arrangement 25 comprises a slide structure built into the guide wall 9 which allows a closing arm of the spring arrangement 25 to slide and pull the guide wall 9 as the spring arrangement 25 opens or closes.

Figure 5:
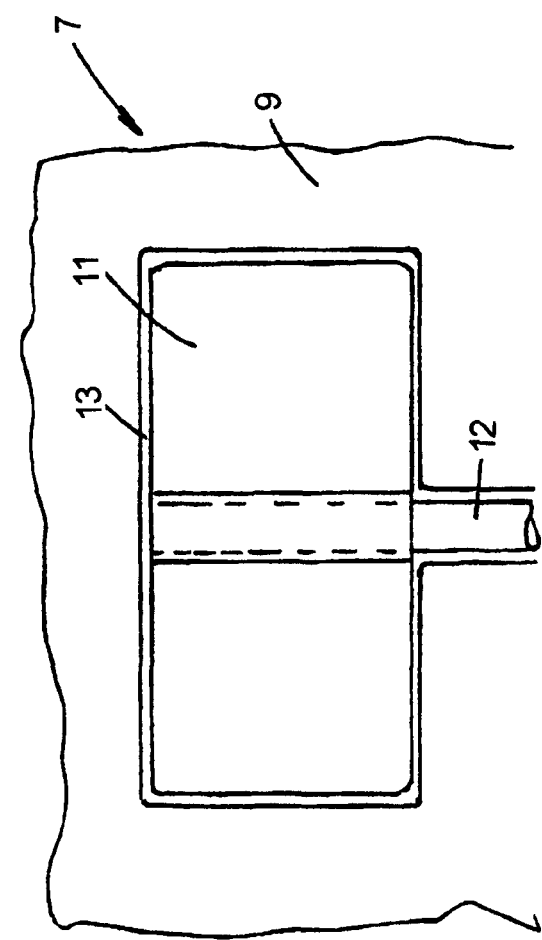
FIG. 5 is a detail in a side view of a control element for the simultaneous or substantially simultaneous adjustment of two container control and guide elements.

As shown in FIG. 5, an opening 13 is provided in the guide wall 7 for the adjustment element 11 in question, so that each adjustment 11 in its initial position does not project beyond the plane of the outside surface of the guide wall 7, which also contributes to the ability of the guide walls 9 to be in tight contact against the guide wall 7 in the initial position.

Figure 6A:
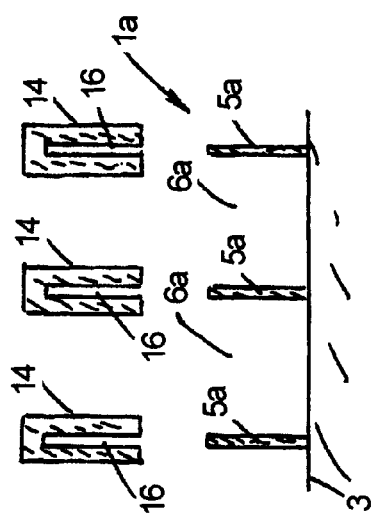
FIGS. 6A, 6B, and 6C are highly simplified illustrations in section of a multiple-lane conveyor line for the transport of containers, together with slide-like guide elements which can be placed on the lane guides to modify the lane width.
Figure 6B:
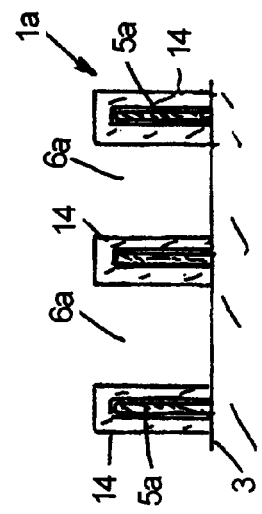
Figure 6C:
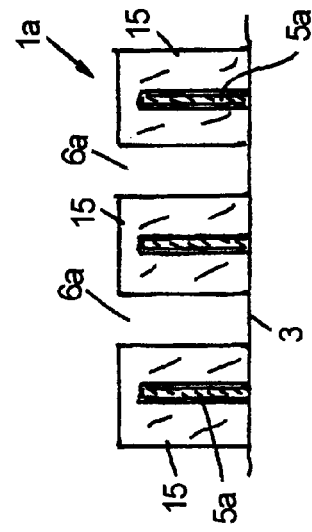

FIG. 6 shows very schematically, in an additional embodiment, a conveyor line 1a which is in turn divided into a plurality of lanes 6a by a plurality of lane guides 5a which are realized in the form of guide walls. To adapt the width of the lanes 6a to containers 2 with different diameters, in this embodiment there are container control and guide elements 14 and 15 which can be inserted from above over the lane guides 5a in the manner of jumpers. The container control and guide elements 14 and 15 can be realized, for example, in the form of plastic moldings and extend over at least a partial length of the conveyor line 1a, over which (partial length) the width of the lane may be adapted to the diameter of the containers 2, for example in the area of the inlet or the outlet of a container treatment machine such as a cleaning machine, for example.

The container control and guide elements 14 thereby have a smaller width than the container control and guide elements 15. As a result of the use of such container control and guide elements of different widths, which can be provided in the form of a set, for example, it is then possible to adapt the width of the lanes to the diameter of the containers 2 that are to be treated.

If the lane guides 5a, analogous to the lane guides 5 or the guide walls 7, are bent in several places, the container control and guide elements 14 and 15 also exhibit this shape or profile, so that they can each be installed from above in the manner of a jumper with their slot-shaped opening 16 which is open on the bottom over the lane guides 5a.

It goes without saying that the container control and guide elements 14, 15 realized in the form of elements that can be positioned from above and can have a pointed shape on their forward ends, viewed in the direction of transport, so that they can securely guide the containers 6 that are being conveyed in the lanes 6.

The possible embodiments were described above on the basis of exemplary embodiments. It goes without saying that modifications and variants can be made without thereby going beyond the teaching of the application.

Figure 7:
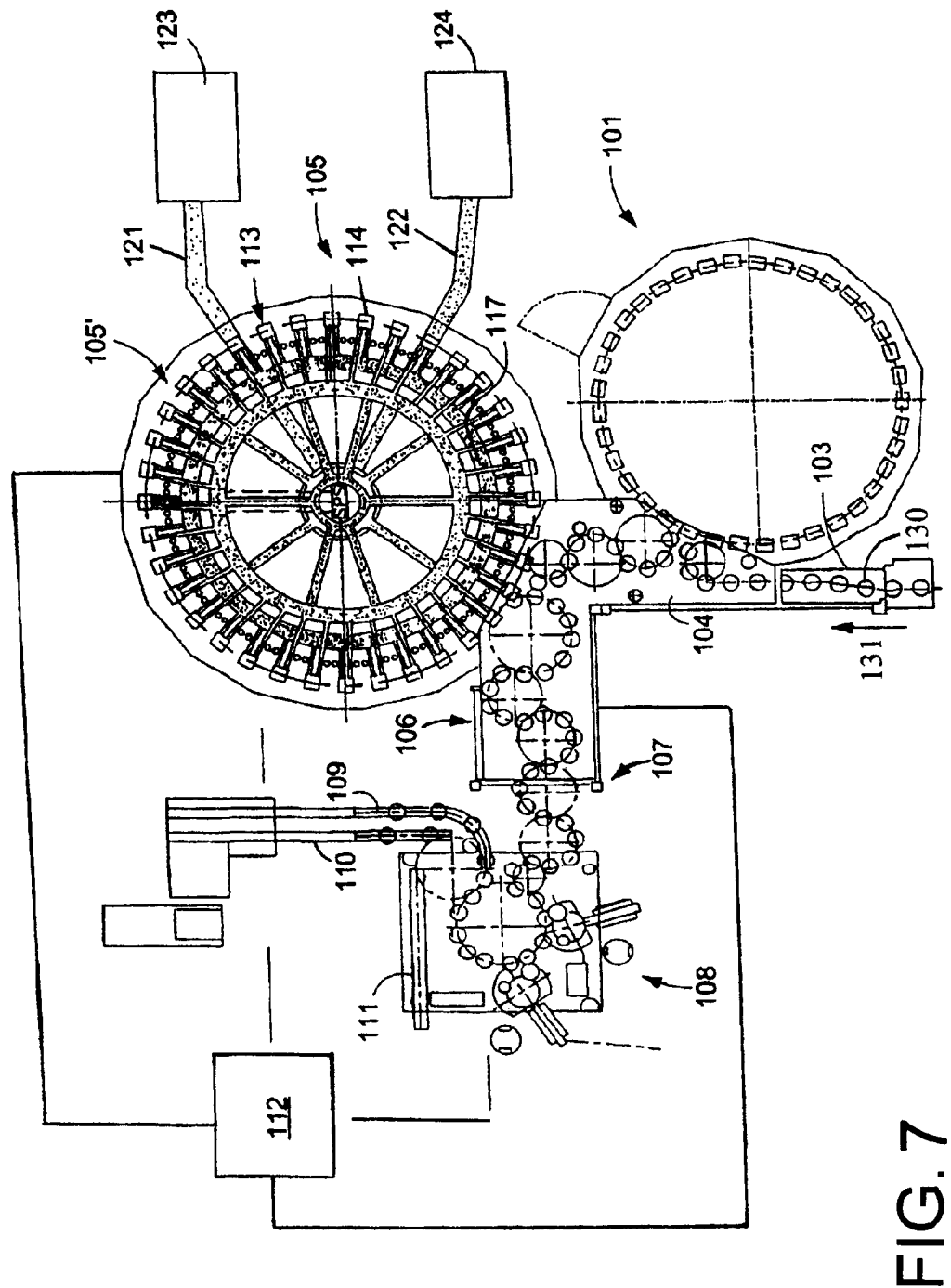
FIG. 7 shows schematically the main components of one possible embodiment example of a system for filling containers in which at least one possible embodiment of the present application could be utilized.

FIG. 7 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 7 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 7, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

One feature or aspect of an embodiment is believed at the time of the filing of this patent application to possibly reside broadly in a conveyor line for the transport of bottles or similar containers 2 in a direction of transport A, whereby the conveyor line 1, 1a for the containers 2 forms, at least over a partial length that extends in the direction of transport A, at least two lanes 6, 6a, which are bounded laterally and separated from one another by lane guides 5, 5a which are at some distance from another in the direction at a right angle to the direction of transport A, wherein in addition to the lane guides 5, container control and guide elements 8, 14, 15 which are oriented with their longitudinal extension in the direction of transport A are provided, which form lateral guide surfaces for the containers 2 in the respective lane 5, 5a and which make possible, at least over a partial length of the lanes 6, 6a by reducing a maximum lane width defined by the distance between the lane guides 5, 5a, an adaptation of the lane width to the diameter of the individual containers 2 to be processed.

Another feature or aspect of an embodiment is believed at the time of the filing of this patent application to possibly reside broadly in the conveyor line wherein the container control and guide elements 8, 14, 15 are each provided on a lane guide 5, 5a.

Yet another feature or aspect of an embodiment is believed at the time of the filing of this patent application to possibly reside broadly in the conveyor line wherein on at least one lane guide 5, 5a that separates two lanes 6, 6a, there is at least one container control and guide element 8, 14, 15 to adapt the lane width.

Still another feature or aspect of an embodiment is believed at the time of the filing of this patent application to possibly reside broadly in the conveyor line wherein the container control and guide elements 14, 15 are made up at least partly of moldings which to reduce the lane width can each be fastened to a lane guide 5a, and can each be positioned on a lane guide 5a.

A further feature or aspect of an embodiment is believed at the time of the filing of this patent application to possibly reside broadly in the conveyor line wherein the container control and guide elements 8, 14, 15 can be adjusted at a right angle to the direction of transport A.

Another feature or aspect of an embodiment is believed at the time of the filing of this patent application to possibly reside broadly in the conveyor line wherein the container control and guide elements 8 or their control or guide surfaces are formed by at least one control or guide wall 9.

Yet another feature or aspect of an embodiment is believed at the time of the filing of this patent application to possibly reside broadly in the conveyor line wherein the container control and guide elements 8 have, on their forward and/or rear end with reference to the direction of transport A, a control or guide segment 9.4, 9.5 which forms a transition between the lane guide 5 and the container control and guide element 8.

Still another feature or aspect of an embodiment is believed at the time of the filing of this patent application to possibly reside broadly in the conveyor line wherein the control or guide segment 9.4, 9.5 is provided in an articulated manner on the container control and guide element 8 and/or on the associated lane guide 5.

A further feature or aspect of an embodiment is believed at the time of the filing of this patent application to possibly reside broadly in the conveyor line wherein the control or guide segment 9.4, 9.5 is provided in an articulated manner on the container control and guide element 8 and/or on the associated lane guide 5.

Another feature or aspect of an embodiment is believed at the time of the filing of this patent application to possibly reside broadly in the conveyor line wherein the transitions between the respective container control and guide element 8 and the neighboring lane guide 5 are wall segments 9.4, 9.5.

Yet another feature or aspect of an embodiment is believed at the time of the filing of this patent application to possibly reside broadly in the conveyor line wherein the at least two container control and guide elements 8 provided one on each side of a common lane guide 5 can be adjusted symmetrically to the lane guide 5.

One feature or aspect of an embodiment is believed at the time of the filing of this patent application to possibly reside broadly in the conveyor line wherein on at least one lane 6, facing the container control and guide element 8 provided on one of the lane guides 5 is a lane guide 5 without such a container control and guide element 8.

Another feature or aspect of an embodiment is believed at the time of the filing of this patent application to possibly reside broadly in the conveyor line wherein on at least one lane 6a facing the container control and guide element 14, 15 provided on one of the land guides 5a, there is an additional container control and guide element 14, 15 on another lane guide 5a.

Yet another feature or aspect of an embodiment is believed at the time of the filing of this patent application to possibly reside broadly in the conveyor line wherein container control and guide elements 8 are provided exclusively on those lane guides 5 which each separate two neighboring lanes 6 from each other.

Still another feature or aspect of an embodiment is believed at the time of the filing of this patent application to possibly reside broadly in the conveyor line wherein there is at least one adjustment element 11, 12 for the adjustment of each container control and guide element 8 at a right angle to the direction of transport A.

A further feature or aspect of an embodiment is believed at the time of the filing of this patent application to possibly reside broadly in the conveyor line wherein when there are two container control and guide elements 8 provided on each side of a lane guide, at least one adjustment element 11, 12 that is common to both container control and guide elements is provided.

Another feature or aspect of an embodiment is believed at the time of the filing of this patent application to possibly reside broadly in the conveyor line wherein when there are a plurality of container control and guide elements 8 and/or a plurality of adjustment elements 11, 12, a common drive for all of the adjustment elements 11, 12 is provided for said container control and guide elements 8.

Yet another feature or aspect of an embodiment is believed at the time of the filing of this patent application to possibly reside broadly in the conveyor line wherein the lane guides 5, 5a are each formed by a guide wall 7 which extends in the direction of transport A and is oriented at a right angle or essentially a right angle to a transport plane 3 of the conveyor line 1, 1a.

This application further relates to a transport path for transporting bottles or similar containers in a transport direction, wherein the transport path for the containers forms at least two channels which are delimited laterally by channel guides and the channel width of which can be adjusted, at least on a part length which extends in the transport direction.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of bottling systems, which may be used or adapted for use in at least one possible embodiment of the present may be found in the following U.S. Patents assigned to the Assignee herein, namely: U.S. Pat. No. 4,911,285; U.S. Pat. No. 4,944,830; U.S. Pat. No. 4,950,350; U.S. Pat. No. 4,976,803; U.S. Pat. No. 4,981,547; U.S. Pat. No. 5,004,518; U.S. Pat. No. 5,017,261; U.S. Pat. No. 5,062,917; U.S. Pat. No. 5,062,918; U.S. Pat. No. 5,075,123; U.S. Pat. No. 5,078,826; U.S. Pat. No. 5,087,317; U.S. Pat. No. 5,110,402; U.S. Pat. No. 5,129,984; U.S. Pat. No. 5,167,755; U.S. Pat. No. 5,174,851; U.S. Pat. No. 5,185,053; U.S. Pat. No. 5,217,538; U.S. Pat. No. 5,227,005; U.S. Pat. No. 5,413,153; U.S. Pat. No. 5,558,138; U.S. Pat. No. 5,634,500; U.S. Pat. No. 5,713,403; U.S. Pat. No. 6,276,113; U.S. Pat. No. 6,213,169; U.S. Pat. No. 6,189,578; U.S. Pat. No. 6,192,946; U.S. Pat. No. 6,374,575; U.S. Pat. No. 6,365,054; U.S. Pat. No. 6,619,016; U.S. Pat. No. 6,474,368; U.S. Pat. No. 6,494,238; U.S. Pat. No. 6,470,922; and U.S. Pat. No. 6,463,964.

Some examples of servo-motors that may possibly be utilized or possibly adapted for use in at least one possible embodiment of the present application may possibly be found in the following U.S. Pat. Nos. 4,050,434 issued to Zbikowski et al. on Sep. 27, 1977; 4,365,538 issued to Andoh on Dec. 28, 1982; 4,550,626 issued to Brouter on Nov. 5, 1985; 4,760,699 issued to Jacobsen et al. on Aug. 2, 1988; 5,076,568 issued to de Jong et al. on Dec. 31, 1991; and 6,025,684 issued to Yasui on Feb. 15, 2000.

Some examples of apparatus and methods of cleaning containers that may possibly be utilized or possibly adapted for use in at least one possible embodiment of the present application may possibly be found in the following U.S. Pat. Nos. 5,092,356 issued to Grot on Mar. 3, 1992; 5,320,144 issued to Ahlers on Jun. 14, 1994; 5,533,552 issued to Ahlers on Jul. 9, 1996; 5,558,135 issued to Kronseder et al. on Sep. 24, 1996; and 5,896,899 issued to Schlitz on Apr. 27, 1999.

The Innopack packaging machine, manufactured by KHS Maschinen und Anlagenbau AG, is an example of a packaging machine which may possibly be utilized or adapted for use in at least one possible embodiment. Some other examples of packaging machines which may possibly be utilized or adapted for use in at least one possible embodiment may possibly be found in the following U.S. Pat. Nos. 4,964,260, entitled "Packaging machine for cardboard boxes and process for packaging articles in cardboard boxes;" 4,785,610, entitled "Automatic machine for packaging products of different kinds in boxes;" 5,265,398, entitled "Automatic counting and boxing machine;" 5,943,847, entitled "Packaging machine for multi-packs;" 5,937,620, entitled "Packaging machine for multi-packs;" 5,711,137, entitled "Packaging machine and method of packaging articles;" and 5,706,633, entitled "Packaging machine and method of packaging articles."

All of the patents, patent applications or patent publications, which were cited in the International Search Report dated Oct. 24, 2007, and/or cited elsewhere are hereby incorporated by reference as if set forth in their entirety herein as follows: DE3613724 A1.

The purpose of incorporating U.S. patents, foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 046 556.3, filed on Sep. 30, 2006 having inventor Klaus JENDRICHOWSKI, and DE-OS 10 2006 046 556 and DE-PS 10 2006 046 556, and International Application No. PCT/EP2007/007817, filed on Sep. 7, 2007, having WIPO Publication No. WO2008/037337 and inventor Klaus JENDRICHOWSKI, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the foreign equivalent patent application PCT/EP2007/007817 and Federal Republic of Germany Patent Application No. 10 2006 046 556.3 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/007817 and Federal Republic of Germany Patent Application No. 10 2006 046 556.3 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE 1, 1a Conveyor line
2 Container
3 Transport surface
4 Container treatment machine
5, 5a Lane guide
6, 6a Lane
7 Guide wall
7.1, 7.2, 7.3 Wall segment of the guide wall 7
8 Container control and guide element
9 Guide wall
9.1, 9.2, 9.3 Wall segment of the guide wall 9
9.4, 9.5 Flexible wall segment
10 Spring element
11 Adjustment element
12 Drive shaft for adjustment element 11
13 Opening
14, 15 Container control and guide element
16 Opening
A Direction of transport
B Adjustment direction for the container control and guide elements 8

What is claimed is:

1. A conveying device configured to transport bottles or containers of varying diameters, said conveying device comprising:
a conveyor being configured to move bottles or containers in a direction of transport;
first and second elongated guide structures, each comprising at least a stationary portion, and being disposed to extend in the direction of transport and to define a lane therebetween;
at least one adjustment guide structure being configured to adjust the width of a portion of said lane to adapt the width of said portion said lane to the diameter of the bottles or containers;
said at least one adjustment guide structure is configured to adjust the width of a portion of at least one of said first and second elongated guide structures to adapt the width of a portion of said lane to the diameter of the bottles or containers; and
said at least one adjustment guide structure comprises one of:
a movable guide wall connected to one of said elongated guide structures; and
a detachable mold configured to be placed on one of said elongated guide structures to adjust the width thereof.

2. The conveying device according to claim 1, wherein:
said conveying device comprises a third elongated guide structure, and said second elongated guide structure is disposed between said first and third elongated guide structures to define two lanes; and
said at least one adjustment guide structure is disposed on said second elongated guide structure.

3. The conveying device according to claim 2, wherein said at least one adjustment guide structure is configured to adjust lane width at a right angle to the direction of transport.

4. The conveying device according to claim 3, wherein said at least one adjustment guide structure comprises a movable guide wall connected to one of said elongated guide structures.

5. The conveying device according to claim 4, wherein said movable guide wall has, on its forward and/or rear end with reference to the direction of transport, a control or guide segment which forms a transition between said movable guide wall and its elongated guide structure.

6. The conveying device according to claim 5, wherein said control or guide segment is provided in an articulated manner on said movable guide wall and/or its elongated guide structure.

7. The conveying device according to claim 6, wherein said control or guide segment is prestressed for flexible contact against said movable guide wall and/or its elongated guide structure, and said control or guide segments are wall segments.

8. The conveying device according to claim 7, wherein one of (A), (B), and (C):
   (A) only one movable wall is disposed in each lane, with no more than one movable wall being connected to an elongated guide structure;
   (B) two movable walls are disposed in each lane, one on each elongated guide structure; and
   (C) only one movable wall is disposed in each lane, with two movable walls being connected to opposite sides of every other elongated guide structure.

9. The conveying device according to claim 8, wherein said at least one movable wall comprises two movable walls, one disposed on each side of said second elongated guide structure, which two movable walls are configured to be adjusted symmetrically to permit adjustment of the width of each lane to have the same width.

10. The conveying device according to claim 9, further comprising at least one adjustment element configured to adjust each movable wall at a right angle to the direction of transport.

11. The conveying device according to claim 10, wherein a single adjustment element is configured to adjust said two movable walls connected to said second elongated guide structure, and said conveying device comprises a common drive arrangement for a plurality of said adjustment elements.

12. The conveying device according to claim 3, wherein said at least one adjustment guide structure comprises said detachable mold configured to be placed on one of said elongated guide structures to adjust the width thereof.

13. The conveying device according to claim 12, wherein said at least one adjustment guide structure comprises a plurality of detachable molds configured to be placed one on each of said elongated guide structures to adjust the width thereof.

14. A method of transporting bottles or containers having varying diameters, said method comprising the steps of:
   adjusting the width of a portion of a lane using at least one adjusting guide structure, which lane is defined by first and second elongated guide structures, each of which elongated guide structures comprises at least a stationary portion and is disposed to extend in a direction of transport, and adapting the width of said portion of said lane to the diameter of bottles or containers to be moved in said lane;
   moving the bottles or containers with a conveyor in said adapted lane;
   adjusting the width of said portion of said lane to a different width and adapting the width to the diameter of additional bottles or containers having a diameter which is different than that of the bottles or containers previously moved in said adapted lane;
   moving the additional bottles or containers of the different diameter in said newly-adapted lane; and
   wherein said at least one adjustment guide structure comprises a detachable mold configured to be placed on one of said elongated guide structures to adjust the width thereof, and said step of adjusting the lane width comprises placing a detachable mold on its elongated guide structure.

15. The method according to claim 14, wherein said step of adjusting the lane width comprises removing said detachable mold from its elongated guide structure and replacing said detachable mold with another detachable mold having a different thickness.

* * * * *